United States Patent [19]

Wilson

[11] Patent Number: 4,536,888
[45] Date of Patent: Aug. 20, 1985

[54] VOICE COMMUNICATION INSTRUMENT SYSTEM WITH LINE-POWERED RECEIVER CONDITIONING CIRCUIT

[75] Inventor: Donald R. Wilson, Santa Cruz, Calif.

[73] Assignee: Plantronics, Inc., Santa Cruz, Calif.

[21] Appl. No.: 295,220

[22] Filed: Aug. 21, 1981

[51] Int. Cl.³ .......................... H03G 7/00; H04M 1/60
[52] U.S. Cl. ....................................... 381/106; 381/72; 179/81 B
[58] Field of Search ................ 179/87 B, 81 R, 1 HF, 179/1 VC, 1 VL, 1 A; 381/72, 102, 104, 106–108, 110, 111–117; 333/14; 455/72

[56] References Cited

U.S. PATENT DOCUMENTS

| 3,562,791 | 2/1971 | Baker | 179/81 B |
| 3,725,585 | 4/1973 | Moniak et al. | 179/81 B |
| 3,786,200 | 1/1974 | Camenzind | 179/81 B |
| 3,969,680 | 7/1976 | Wermuth | 381/106 X |
| 4,322,579 | 3/1982 | Kleis et al. | 381/106 |

FOREIGN PATENT DOCUMENTS

| 1546672 | 5/1979 | United Kingdom . |
| 1318054 | 5/1979 | United Kingdom . |
| 1550721 | 8/1979 | United Kingdom . |
| 1553277 | 9/1979 | United Kingdom . |

OTHER PUBLICATIONS

*Electronics,* vol. 52, No. 3, Feb. 1, 1979, pp. 115–117, G. Marosi, "Acoustic Protector Damps Telephone-Line Transients".
Holtz et al., "An Experimental Electronic Telephone".
"Low-Power Bipolar Op-amp Needs 1.1V", *Electronic Design News,* Jul. 20, 1979.
"Low Current and Low Voltage IC Design", (undated publication of Interdesign, Inc., of Sunnyvale, Calif.
"New Process Makes Possible 1-Volt Linears", *Electronics,* Mar. 2, 1978.
"Low Voltage Techniques", reprint from *IEEE Journal of Solid-State Circuits,* Dec. 1978.
Plantronics Models 0300 and 0600 Receiver Optimization Circuit (ROC), (General description/installation instructions brochure), Jan. 1979.

Primary Examiner—Gene Z. Rubinson
Assistant Examiner—W. J. Brady
Attorney, Agent, or Firm—Arnold, White & Durkee

[57] ABSTRACT

A voice communication instrument system for two-way voice communication is disclosed. The system includes a voice communication instrument having a microphone and a receiver transducer, and a transmit-receiver circuit system comprising a transmit conditioning circuit and a receiver conditioning circuit. The transmit conditioning circuit provides amplification and frequency response correction of microphone electrical voice signals. The receiver conditioning circuit provides linear compression limiting, amplification, and, if desired, frequency response correction to an incoming electrical voice signal prior to introduction to the receiver transducer. The receiver conditioning circuit is powered from the transmit circuit D.C. output voltage, at low voltage and low current. The receiver conditioning circuit has a transformerless input circuit, and further includes bias current control to the various circuit stages to eliminate the effects of supply voltage fluctuations.

11 Claims, 7 Drawing Figures

VOICE COMMUNICATION INSTRUMENT SYSTEM WITH LINE-POWERED RECEIVER CONDITIONING CIRCUIT

FIELD OF THE INVENTION

The present invention relates to instruments for two-way, transmit and receive, voice communication over a wired interconnection to a communication link such as a telephone line circuit. More particularly, the present invention relates to apparatus for conditioning an incoming electrical voice signal, i.e., "receiver conditioning".

BACKGROUND OF THE INVENTION

Receiver conditioning in voice communication, particularly telephone communication, primarily addresses the problems of weak incoming electrical voice signals and large amplitude electrical signals which produce acoustic shock to the listener's eardrum. To alleviate the problem of weak incoming electrical voice signals, additional receiver gain is beneficial. To obviate acoustic shock from incoming electrical signals of excessive amplitude, compression of the incoming signal is provided to linearly reduce the amplitude and at the same time avoid introducing harmonic distortion.

Heretofore, so-called "hard-of-hearing" amplifier devices have been utilized as a solution to weak incoming voice signals and high background noise environment problems. Illustrative of these devices is the Western Electric Co. 153B amplifier. However, such devices do not provide for compression of large amplitude incoming signals, with the result being that the listener is left vulnerable to very high sound pressure levels at the ear termed "acoustic shock".

A device heretofore utilized to provide signal gain yet compress received audio signals to a specific maximum level without harmonic distortion is the Model ROC 300 manufactured by Plantronics, Inc., Santa Cruz, Calif. 95060. The ROC device is a discrete components circuit type device, and thus it is rather large physically. Also the ROC device is powered by an external power supply of 24 or 48 volts. The necessity of an external power supply limits the ROC device to installation in a console, for example, in PABX systems.

SUMMARY OF THE INVENTION

The present invention provides a voice communication instrument system for two-way, transmit and receive, voice communication to and from a primary communication link, such as a telephone line. The system includes a receiver conditioner circuit which provides gain, linear compression limiting, and optionally frequency response correction. The receiver conditioner circuit is suitable for line-powered operation, and thus does not depend on local external power. As used herein, "line-powered" means that electrical operating power (i.e., voltage and current) is supplied from the telephone line. In a typical telephone-type voice communication instrument system, e.g., telephone handset or headset, the electrical power for the receiver conditioning circuit is supplied from the transmit output terminals connecting to a four wire-to-two wire hybrid circuit.

In accordance with the present invention, the receiver conditioning circuit provides linear compression limiting, amplification, and optionally frequency response compensation to incoming electrical signals, particularly electrical voice signals. In particular, the receiver conditioning circuit provides protection to a communication instrument user against acoustic shock, improves overall communication intelligibility, and provides signal-to-local noise improvement.

The receiver conditioning circuit receives input signals and provides output signals to a receiver transducer which converts electrical signals to acoustic signals. The circuit includes a balanced input for eliminating common-mode signals and an input circuit for attenuating input signals. A compressor amplifier stage is provided for effecting compression of input signals. A compression control detector compares the receiver circuit output voltage with a reference signal and in response controls the bias current to the compressor amplifier stage. The compressed signal is amplified and then applied to a power amplifier stage which drives the receiver transducer. A bias current controller adjusts the bias for the various circuit stages. A current steering circuit accepts input voltages of either polarity and steers them to the supply voltage and ground terminals to provide direct current electrical power for the circuit.

Suitably, the receiver conditioning circuit is embodied with a substantial portion in integrated circuit form and another portion in discrete electronic components. Advantageously, the receiver conditioning circuit is operational at low voltage (i.e., less than 1.6 volts) and with low current (i.e., less than 1000 microamperes). The circuit will, however, operate successfully with power supply voltages to 6.3 volts, drawing less than 3 millamperes.

A communication instrument system in accordance with the present invention is characterized in that a communication instrument having a microphone, for converting acoustic voice signals into electrical signals for transmission, and a receiver transducer, for converting received electrical signals into acoustic signals to be conducted to the user's ear, is coupled to a transmit-receiver circuit system including a transmit conditioning circuit and a receiver conditioning circuit. The receiver conditioning circuit provides conditioning, including linear compression limiting, of incoming line signals, and is powered from the transmit circuit output. The circuit includes balanced input means for providing common-mode rejection, and input circuit means for attenuating incoming electrical voice signals so that there is less distortion of the signal in the compression process and the common-mode range is enhanced.

A communication instrument in accordance with the present invention may be further characterized in that a bias current controller in the receiver conditioning circuit controls the bias current to the various circuit stages eliminating effects from power supply voltage fluctuations.

DETAILED DESCRIPTION

Figure 1:
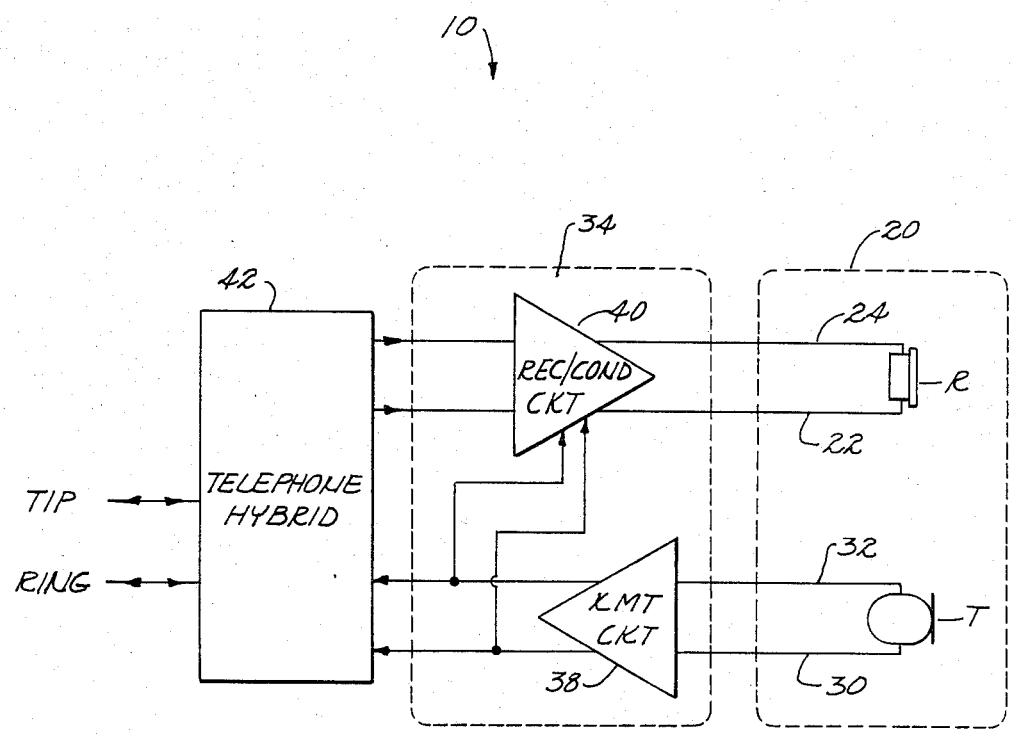
FIG. 1 is a diagram of a voice communication instrument system in accordance with the present invention.

Referring to FIG. 1, a voice communication instrument system 10 in accordance with the present invention is shown. The voice communication instrument system includes a voice communication instrument 20, which may be a headset or a handset. Receiver transducer R receives electrical voice signals via wires 22, 24 and converts these signals to audible sound signals. The audible sound signals from transducer R are conveyed to the user's ear by suitable means. The microphone transducer T is provided for converting acoustic voice signals to electrical voice signals. Voice signals are conveyed to the microphone transducer via suitable means. Electrical voice signals are conveyed from transducer T over wires 30, 32. Wires 22, 24 and 30, 32 are connected to a transmit-receiver circuit system 34, which is suitably packaged, for example, in a plug housing.

The transmit-receiver circuit system 34 includes a transmit conditioning circuit 38 and a receiver conditioning circuit 40. The transmit conditioning circuit and the receiver conditioning circuit are interfaced to the tip and ring lines of a telephone line by a conventional telephone hybrid circuit 42. For line-powered operation of the system 34, D.C. power is supplied via the tip and ring wires of the telephone line.

The receiver conditioning circuit 40 provides compression, amplification and the optional frequency response correction to an incoming electrical voice signal. The receiver conditioning circuit can receive its power from the transmit circuit 38 output lines. Accordingly, receiver conditioning circuit 40 can be "line-powered".

By reason of the compression function of the receiver conditioning circuit, protection of the user's eardrums from acoustic shock due to signals of excessive amplitude is provided. As used herein, the term "compression" refers to a process in which the effective amplification of an incoming electrical voice signal is varied as a function of the magnitude of the signal, the effective gain being reduced for signal magnitudes above a compression threshold level. In addition, receiver conditioning circuit 40 can provide amplification for incoming electrical voice signals lower in amplitude than the compression level to provide improved signal-to-local noise characteristics. Furthermore, frequency response conditioning to improve overall system intelligibility can be provided. In this regard, a 3 to 5 dB boost in 3 KHz response compared to the 1 KHz response is sometimes desirable.

Figure 2:
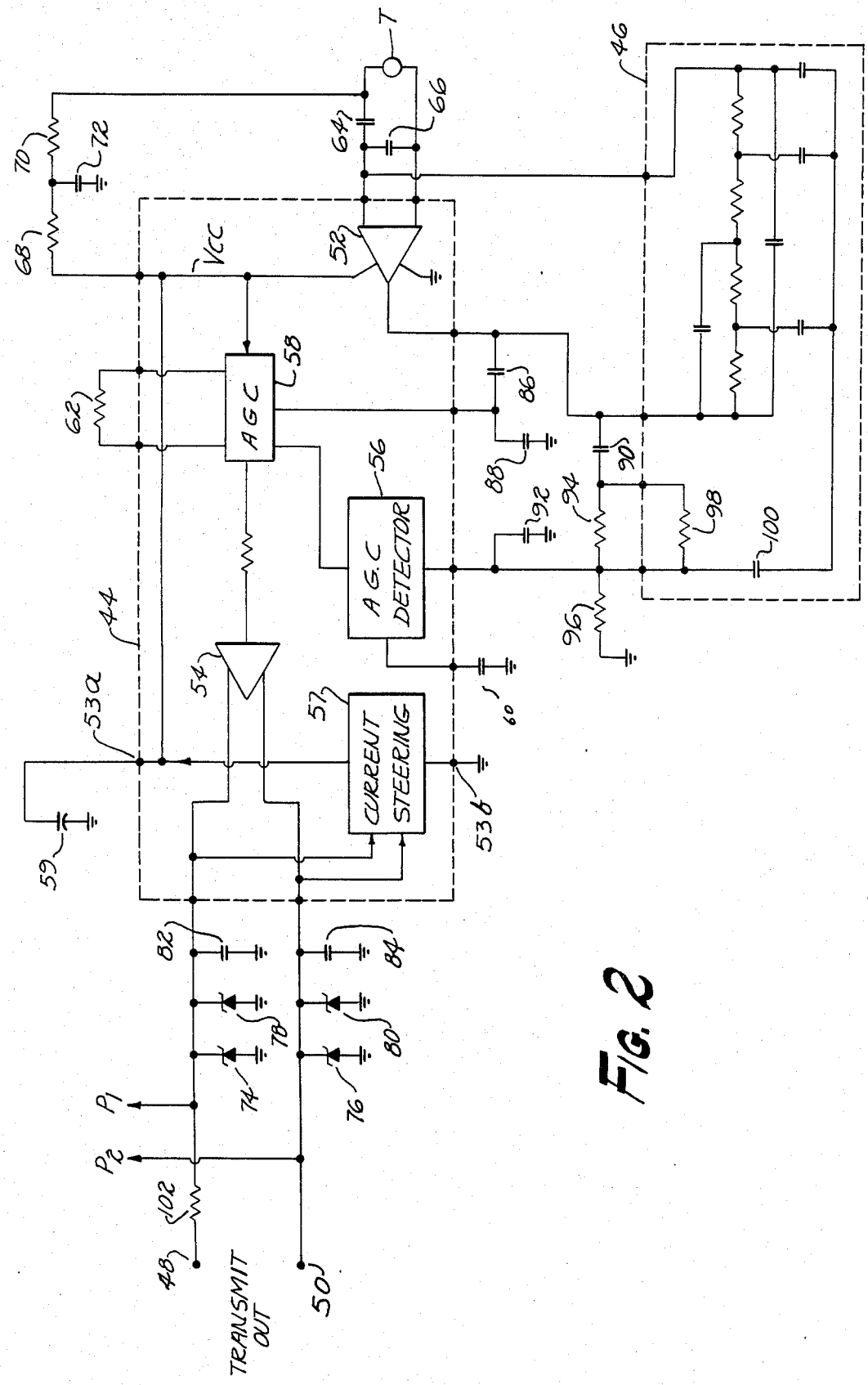
FIG. 2 is a diagram of a transmit circuit for use in the system shown in FIG. 1.

Referring next to FIG. 2, there is shown a diagram of transmit circuit 38 of the transmit-receiver circuit system 34 diagrammed in FIG. 1. Transmit circuit 38 comprises a first active element circuit 44, a passive network circuit 46, and other passive discrete components.

Preferably, circuit 44 is a device as described in U.S. Pat. No. 3,786,200, issued Jan. 15, 1974, and assigned to the assignee of the present application. U.S. Pat. No. 3,786,200 is hereby incorporated by reference in its entirety. Also, circuit 44 may be a device such as Plantronics, Inc. Part No. 09079-00.

Circuit 44 provides amplified microphone electrical voice signals over lines 48 and 50 while receiving electrical power for operation over the same lines 48 and 50. A D.C. voltage, with the amplified voltage superimposed will appear at terminals P1 and P2, and this voltage may be used to power the receiver conditioning circuit 40.

Circuit 44 basically includes a pre-amplifier 52, a power amplifier 54, and automatic gain control (AGC) circuitry including AGC detector 56 and AGC circuit 58, and a current steering circuit 57. The power amplifier 54 provides an output for either polarity of line current. That is, the power amplifier 54 output circuit comprises a DC loop in which direct current flows in one leg and out the other with the audio signal being modulated onto the D.C. signal.

Current steering circuit 44 comprises a transistor network for steering the D.C. voltage appearing on the output terminals P1 and P2 of circuit 44 to filter capacitor 59 and to other functional elements within transmit circuit 44. The terminals 53a and 53b are preferably not used to supply operating power to the receiver conditioning circuit 40. This is because of the fluctuating load presented by circuit 40 which would modulate the voltage at the terminals. Such modulation would cause spurious signal output by circuit 44 when the receiver circuit is handling incoming voice signals. Accordingly, the arrangement shown for powering receiver conditioning circuit 40 is believed to be preferable.

As further shown in FIG. 2, one portion of RC network 46 connects between the output of pre-amplifier 52 and an input thereof. Network 46 provides a feedback network for pre-amplifier 52 which establishes a desired frequency response. Network 46 preferably is a network as diagrammed in FIG. 2, such as Plantronics, Inc. Part No. 11263-01.

With regard to the external components associated with circuit 44, capacitor 60 sets a time constant for a voice switching gain control function provided in circuit 44, which switches circuit gain from low gain to high gain in response to an input electrical voice signal. Resistor 62 connected to AGC circuit 58 establishes the output impedance and gain of that stage. Capacitors 64 and 66 provide a coupling network between preamplifier 52 and the microphone transducer T. A voltage divider network comprising external resistors 68, 70 provides an operating bias current to microphone transducer T. A filter capacitor 72 removes spurious signals from the bias current.

On each output leg of power amplifier 54 protective devices are provided. These devices include zener diodes 74, 76 and diodes 78, 80. These diodes provide static discharge and lightning stroke protection for circuit 44. Also, radio frequency interference suppressor capacitors 82, 84 are provided. These components also protect the input circuit of receiver conditioning circuit 40 to which terminals P1 and P2 are connected.

Because of the base-emitter breakdown voltage of transistors in typical integrated circuit devices, the maximum D.C. voltage between P1 and P2 terminals for normal operation of receiver circuit 40 and transmit circuit 44 is about 7 volts. By using a zener diode voltage of 6.3 volts for devices 74, 76, an optimum compromise is reached for the normal range of operation and transient protection. Diodes 78, 80 are preferably germanium diodes to insure against "latch-up" under high-voltage transient input conditions.

In some telephone systems, D.C. voltages greater than 7 volts are desired, and such voltages would appear between lines 48 and 50. The function of resistor 102 is to maintain low terminal voltage at P1 and P2 even though there is a higher D.C. voltage on lines 48 and 50. The value of resistor 102 also adds to the A.C. output impedance of circuit 44 appearing at terminals 48 and 50.

Capacitors 86, 88 are included to provide a coupling network between the output of pre-amplifier 52 and AGC circuit 58. The output of pre-amplifier 52 is also coupled to AGC detector 56 by a network comprising capacitors 90, 92 and resistors 94, 96 in combination with resistor 98 and capacitor 100 in network 46. Finally, connected in transmit output line 48 is a current-limiting resistor 102.

Figure 3:
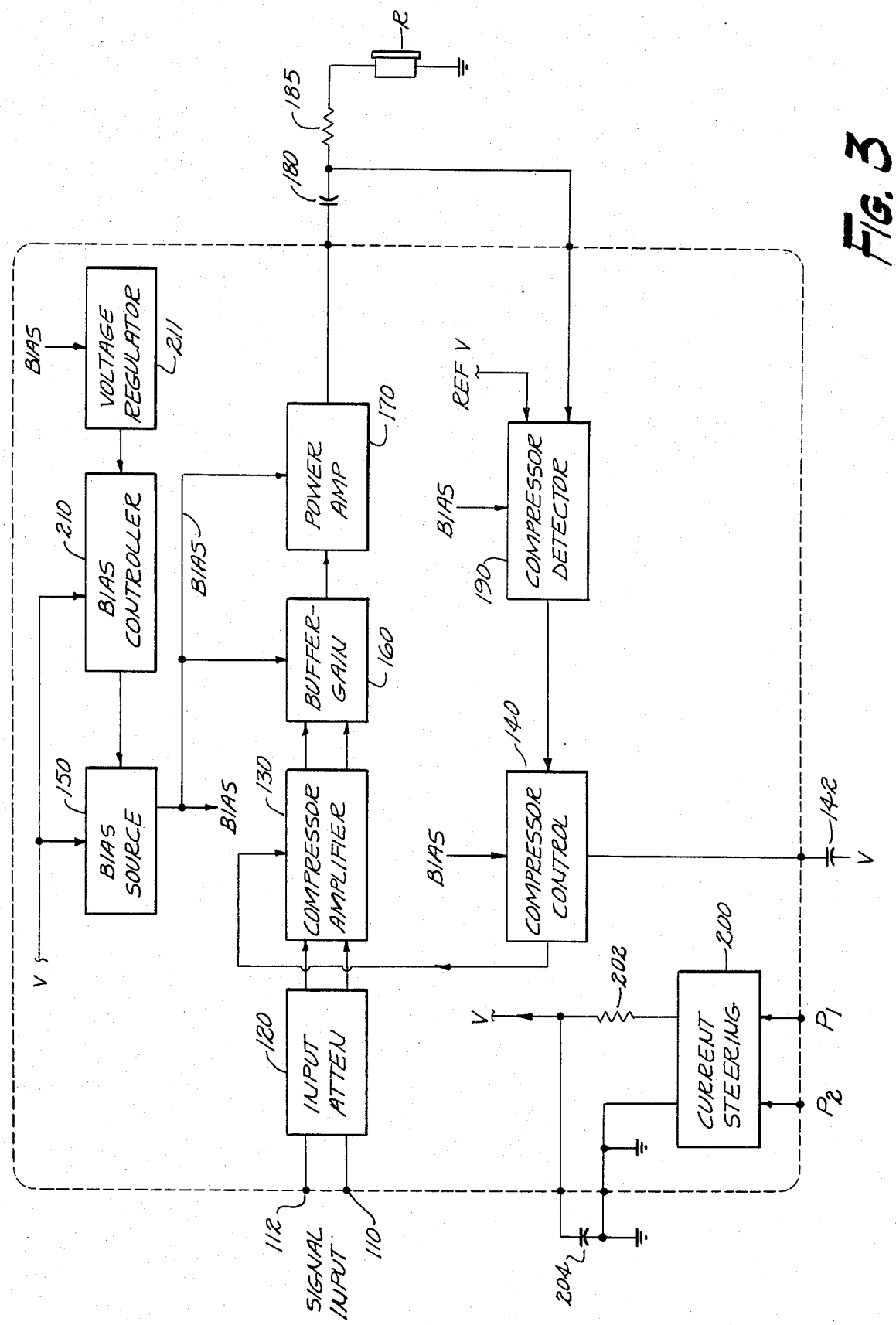
FIG. 3 is a block diagram of a receiver conditioning circuit for use in the system shown in FIG. 1.

Referring next to FIG. 3, a block diagram of the receiver conditioning circuit is presented.

Electrical voice signals incoming from a telephone hybrid circuit are applied to input lines 110, 112 which lead to input attenuation means 120. Preferably, input attenuation means 120 yields 20 dB of attenuation. Attenuated incoming electrical voice signals are applied to compressor amplifier 130. This stage of the receiver conditioning circuit provides means for applying compression to incoming electrical voice signals. Amplifier 130 is preferably a balanced input amplifier so as to eliminate common mode voltages that would appear on the input circuit for some telephone hybrid circuits. It is important to note that by reason of the signal attenuation provided by input attenuation means 120, incoming electrical voice signals suffer less distortion in the compression process. Also, the common mode range is increased by the amount of the input attenuation added.

Compressor amplifier 130 suitably provides a normal gain of unity for signals lower than the compression threshold, with the compression being decreased for strong signals. The gain setting of amplifier 130 is established by a signal provided from the compression control circuit 140 having an external timing capacitor 142. Suitably, amplifier 130 operates on the "starved amplifier" principle in which gain decreases as the operating current for the amplifier is reduced. Accordingly, the compression control circuit 140 provides control over the supply of bias current to the compressor amplifier stage. Bias current to the compression control circuit is derived from bias current source 150.

The compressor amplifier output is applied to buffer-gain stage 160. In this stage, there is a removal of voltage variations of the common-mode type in the compressed incoming electrical voice signal caused by varying the bias current to amplifier 130. In addition, stage 160 performs a balanced-to-unbalanced conversion, and provides sufficient gain to overcome the input attenuation loss and output load matching loss. Suitably, the gain through stage 160 provides a maximum overall system gain of 10 dB.

The amplified incoming electrical voice signals from the buffer-gain stage are applied to a power amplifier 170. Voltage gain is approximately unity in power amplifier 170; however, power amplifier 170 provides a significant increase in current drive capability in order to adequately drive receiver transducer R.

A coupling capacitor 180 and impedance matching resistor 185 couple power amplifier 170 to receiver transducer R. The power amplifier output signal stripped of its D.C. component is also applied to a compression detector circuit 190.

The receiver conditioning circuit is line-powered. That is, the operating power for the circuit is from the transmitter circuit output lines. As described previously, the transmitter output circuit D.C. voltage can be of either polarity. Accordingly, in order to obtain a polar signal, i.e., a D.C. signal, for operating power, a current steering circuit 200 is coupled to the transmit circuit output lines designated as $P_1$ and $P_2$. Suitably, current steering 200 is a circuit constructed in accordance with the teachings of U.S. Pat. No. 3,786,200 referred to previously.

Current steering circuit 200 accepts input voltages of either polarity and steers them to the V and ground terminals. The voltage V is always of positive polarity and is filtered by resistor 202 and a capacitor 204 to remove A.C. signal components. Current steering is accomplished by saturating stages of NPN and PNP transistors in accordance with the teachings of U.S. Pat. No. 3,786,200. By use of this type of current steering circuit rather than by a conventional arrangement of diodes, operation is assured to much lower line voltages and currents. The power supply voltage V will range from approximately 1.2 to 3.0 volts while the P1–P2 voltage varies from 1.6 to 6 volts. Current steering circuit 200 provides a power source capable of supplying on the order of 1000 microamperes.

Operating current to the various stages of the receiver conditioning circuit is provided via bias current source 150. Operating current to the various stages through bias source 150 is controlled by a bias current controller 210. The bias current controller is suitably a circuit which compares the voltage drop produced by bias current in a resistor to a regulated voltage source and produces an error signal used as a control signal to adjust bias current source 150. Accordingly, the operating circuit bias is adjusted to remain constant despite fluctuations in supply voltage V; and as a result, the receiver conditioning circuit parameters are made relatively immune to large changes in power supply voltage.

Figure 4:
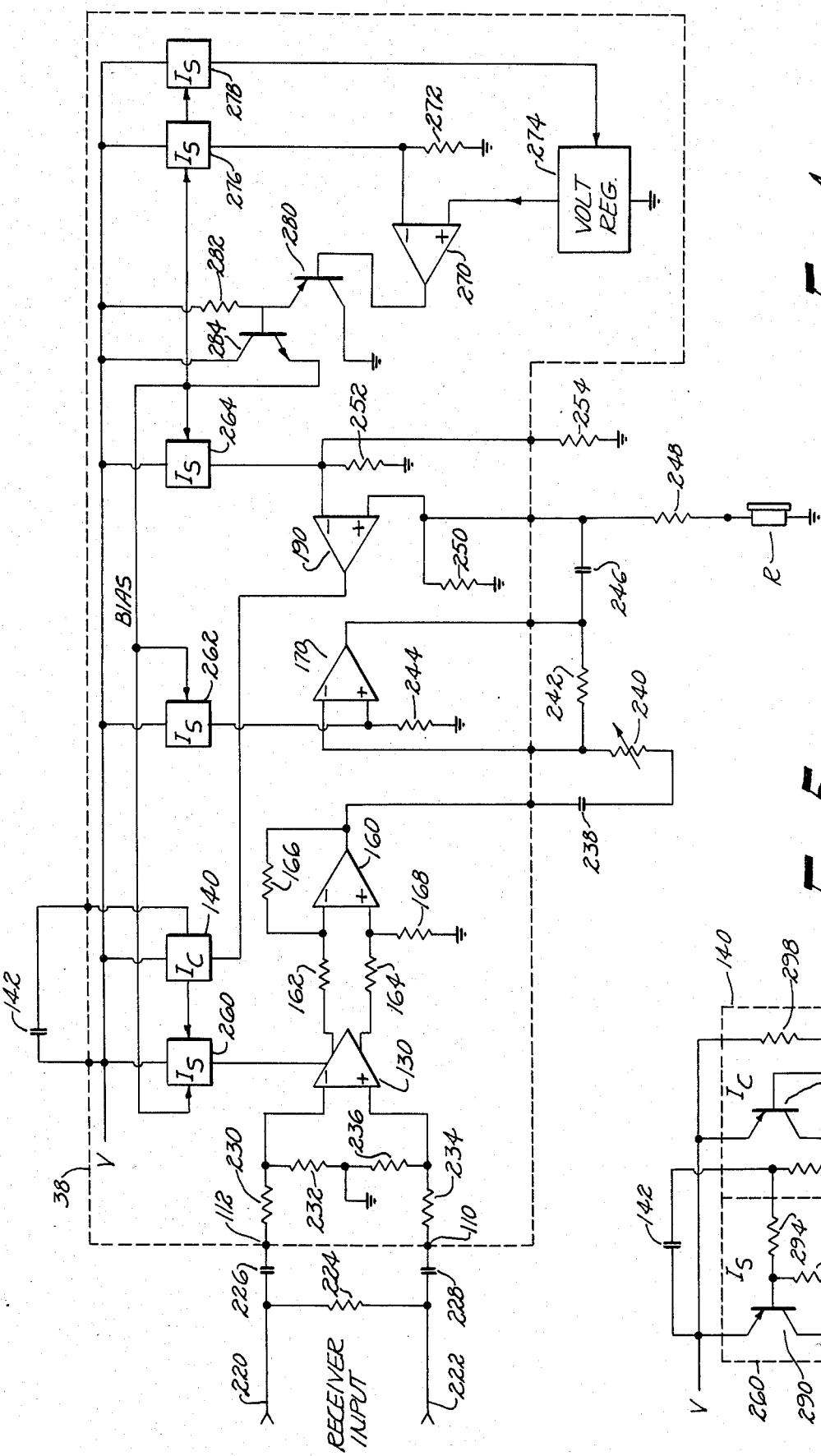
FIG. 4 is a diagram of an implementation of the receiver conditioning circuit of FIG. 3.

Referring now to FIG. 4, there is presented a more detailed diagram of the receiver conditioning circuit 38. An incoming electrical voice signal is applied to receiver circuit input terminals 220, 222 having connected therebetween an impedance-matching input resistor 224. Connected in series with each input terminal is a capacitor 226, 228, which in turn connects, respectively, to input leads 110, 112 of the input attenuator. The function of the capacitors is to remove any D.C. component from the signal existing between input terminals 220 and 222. The capacitors should either be large enough so that common-mode input balance is not affected by the tolerance of the capacitance, or alternatively the capacitors should be matched. As shown, the input attenuation means is suitably implemented by matched resistor pairs connected as voltage divider networks. The first arm of the voltage divider network comprises resistors 230, 232; and the second arm of voltage divider network comprises resistors 234, 236. Suitably, resistors 230, 232 are 100 K ohm values; and resistors 234, 236 are 10 K ohm values. The ratio of these resistors should be held to closer than 0.5% of matching values to insure a 40 dB input common-mode balance.

The compressor amplifier stage 130 is suitably a differential amplifier having the inverting input connected to the junction of resistors 230, 232 and the non-inverting input connected to the junction of resistors 234, 236. This amplifier is suitably implemented with a matched pair of lateral PNP transistors with sufficient emitter resistance so that variations in current gain of from 20 to 150 produces only a 0.5 dB change in gain.

The necessity for a balanced input circuit with common-mode balance of 40 dB minimum and common-mode range of 1 volt RMS comes about as a result of the presence of power line induction voltages in the circuit wiring of some 2-wire to 4-wire networks.

The amplifier 130 output is a balanced output, and it is applied to the differential inputs of gain stage amplifier 160 via resistors 162, 164. The gain stage further includes feedback resistor 166 and a balancing resistor 168.

The output signal of gain stage 160 is coupled through capacitor 238 and gain adjustment potentiometer 240 to the inverting input of power amplifier 170. A feedback resistor 244 establishes the gain for amplifier 170. A bias resistor 242 is connected to the non-inverting input of power amplifier 170 and receives a regulated bias current to establish the output operating bias point for amplifier 170.

The output of power amplifier 170 is coupled through capacitor 246 and applied via output impedance matching resistor 248 to receiver transducer R.

The output signal of power amplifier 170 coupled through capacitor 246 is also applied to the non-inverting input of compressor detector 190. A shunt resistance to ground in the form of resistor 250 is also connected to the non-inverting input of detector 190. The inverting input of detector 190 receives a constant current flow and has connected thereto a shunt resistance comprising a network of parallel-connected resistors 252, 254. The output of compressor detector 190 is applied to control circuit 140. Resistor 254 suitably allows adjustment of the compression threshold to a lower signal level.

As indicated in FIG. 4, current is provided to each stage of circuit 38 by bias current sources designated $I_s$. For example, bias current source 260 provides current to compressor amplifier stage 130. Similarly, bias current sources 262, 264 provide bias current to inputs on the power amplifier stage and the compressor detector stage. It is to be understood, that although not shown in order to simplify the drawing, additional bias current sources would be provided to supply the operating current for the differential amplifier circuitry in the power amplifier and detector stages.

Control of the bias current sources is provided by a bias controller which includes a differential amplifier 270 having a resistor 272 connected to the inverting input and a reference voltage regulator 274 connected to the non-inverting input. Resistor 272 is also connected to a controlled bias current source 276 and supplied with a constant current to produce a voltage thereacross proportional to the current. Voltage regulator 274 provides a reference voltage, suitably of 150 millivolts. Voltage regulator 274 receives electrical current through a bias current source 278.

In operation of the bias controller, fluctuations in power supply voltage V produce corresponding variations in the voltage developed across resistor 272. The reference voltage from voltage regulator 274, however, remains constant. This unbalances amplifier 270. When differential amplifier 270 is unbalanced, an error signal is developed. The error signal is applied to the base of transistor 280 to control the current flow therethrough and establish a voltage drop thereacross. Transistor 280 is connected as a voltage follower with the emitter connected to the power supply voltage V through resistor 282. The base of transistor 284 connects to the emitter of transistor 280 so as to be controlled thereby. The emitter of transistor 284 provides the bias control signal which is applied to each of the bias current sources in circuit 38. Accordingly, in response to the error signal from amplifier 270, transistor 280 acts to adjust the current drive through transistor 284 to the bias current sources such that the current to each stage of circuit 38 is kept constant.

It should be noted that the bias sources will not start delivering bias automatically following application of power. Thus, a start-up circuit is required which will force the bias to flow until the bias regulator stage becomes active.

Figure 5:
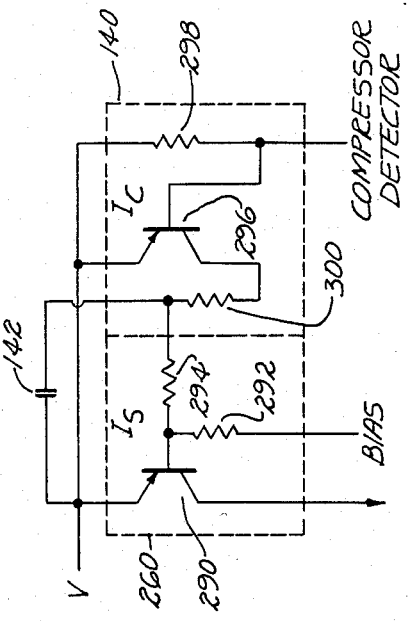
FIG. 5. is a diagram of the bias source and compression control circuit blocks shown in FIG. 4.

Referring now to FIG. 5, there is a more detailed diagram of the bias current source 260 and the compressor control circuit 140 shown as blocks in FIG. 4. The bias current source 260 comprises a transistor 290 having its base connected to resistor 292 to receive the bias control signal (BIAS). The base of transistor 290 is also connected to resistor 294, which connects to the current control circuit 140.

The compressor control circuit 140 comprises a transistor 296 having a bias resistor 298 connected between the power supply voltage V and the base. The base is also connected to receive the compressor detector signal. The collector of transistor 296 is connected by resistor 300 to resistor 294 in bias current source 260 and to compressor timing capacitor 142. Capacitor 142 together with resistors 300, 294, 292 sets the attack and release time of the compressor amplifier stage 130. Suitably, the attack time of the compressor amplifier stage is on the order of 5 milliseconds, as established by capacitor 142 and resistor 300. Capacitor 142 and resistors 292, 294 are chosen such that the compressor amplifier stage release time is on the order of 200 milliseconds.

With the circuit arrangement of FIG. 5, the current to the compressor amplifier stage 130 is controlled by both the bias control signal (BIAS) and the compressor detector signal. The bias control signal input to source 260 affords compensation for fluctuations in power supply voltage. The compression detector control signal input applied to source 260 via circuit 140 affords reduction control of the effective gain of stage 130 over a range of about 20 dB providing the linear compression range. Further limiting of the signals beyond the linear range of 20 dB is accomplished in stages 160 and 170 by gaining potentiometer 240. This removes large input signals which would otherwise be passed to the receiver transducer, and provides protection to the user's ear.

Suitably, receiver conditioning circuit 38 would be provided in integrated circuit form and packaged in a conventional dual in-line package having twelve or more pins. In FIG. 4, a dotted outline has been made around the portion of the diagram shown therein which desirably would be integrated into a single chip. The components outside the dotted outline would, of course, be mounted as external components on a printed circuit board.

Furthermore, the transmit circuit 44 would preferably be mounted on a printed circuit board together with the receiver conditioning circuit 38.

Alternatively, the receiver conditioning circuit and the transmit circuit could be integrated into a single chip and provided as a single device package.

Figure 6A:
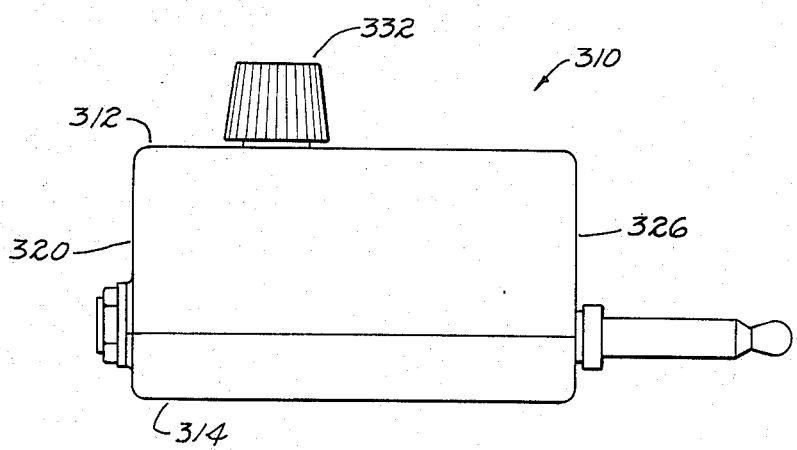
FIGS. 6A and 6B are side and top views, respectively, of a plug-in housing suitable for enclosing and packaging the transmit-receiver circuit system.
Figure 6B:
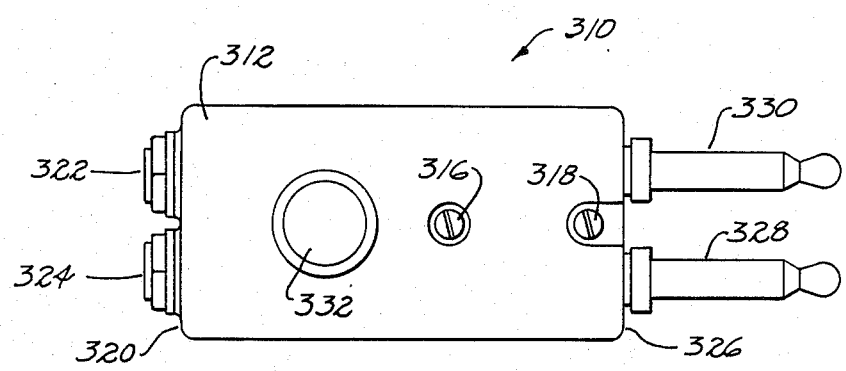

Referring to FIGS. 6A and 6B, there is shown a plug-in housing 310 for packaging the transmit-receiver circuit system of the voice communication instrument system shown in FIG. 1. FIG. 6A shows housing 310 in a side view and FIG. 6B shows housing 310 in a plan view. Housing 310 has mating top and bottom sections 312, 314, respectively. The top and bottom sections are held together by screws 316, 318. Housing 310 is adapted to mount inside a printed circuit board mounting the transmit circuit 38 and the receiver conditioning circuit 40. Furthermore, housing 310 carries in the end 320 plug jack receptacles 322, 324 for receiving jacks (not shown) connected to wires 22, 24 and 30, 32 in cable 26 in FIG. 1. In the end 326 of housing 310, plug jacks 328, 330 are mounted. Plug jacks 328, 330 provide for connection of the transmit-receiver circuit system to telephone hybrid circuit 42. Extending external of housing top section 312 is a knob 332 providing for adjustment of variable gain resistor 240 shown in the diagram of FIG. 4.

It will be appreciated that rather than using plug jacks on cable 26 and receptacles 322, 324, the wires 22, 24 and 30, 32 could enter directly through the end 320 of housing 310 and connect inside housing 310 to the transmit circuit and the receiver conditioning circuit.

As used herein, the term "electrical voice signals" includes the various processed forms of such signals. In the case of a received electrical voice signal incoming through a telephone hybrid circuit, the term "electrical voice signals" refers to the signal available from the hybrid circuit and altered forms thereof such as compressed versions, attenuated versions, amplified versions, filtered versions, etc.

The foregoing description has been of but one implementation of the invention; many uses and modifications of the present invention will be apparent to those skilled in the art. It is, accordingly, the intention that the following claims cover all equivalent modifications and variations as fall within the scope of the invention.

What is claimed is:

1. A receiver conditioning circuit for providing conditioned receiver audio signals comprising:
    input circuit means, for attenuating incoming electrical voice signals;
    means for linearly applying compression to attenuated incoming electrical voice signals in response to a compression control signal, to limit said signals to specific maximum level;
    means coupled to said signal compression means, for providing signal gain to compressed signals, and for generating a signal to drive a receiver transducer receiver audio signals;
    a compression detector coupled to said gain means for comparing the amplitude of the receiver transducer driving signal with a reference level and producing the compression control signal; and
    means for supplying operating bias current to said compression means;
    said bias current supply means receiving the compression control signal and in response supplying operating current to said compression means that establishes the effective amplification of attenuated incoming electrical voice signals.

2. The circuit of claim 1 which further comprises:
    a bias controller responsive to circuit power supply voltage level, for producing a bias control signal,
    said bias controller being coupled to said bias current supply means to apply the bias control signal thereto and provide regulation of the operating bias current in the presence of large supply voltage level fluctuations.

3. The circuit of claim 2 further comprising:
    current steering means connected to said bias controller for converting both polarities of electrical signals into direct current electrical power.

4. A receiver conditioning circuit for compressing received audio signals to a specific maximum level, comprising:
    a balanced input compressor amplifier stage, for applying compression to incoming electrical voice signals to limit the amplitudes thereof,
    said compressor amplifier stage varying signal gain as the operating current for the stage is varied;
    an input attenuator, for attenuating incoming electrical voice signals prior to compression to reduce distortion in the compression process, and for providing a larger common-mode range,
    said input attenuator comprising a resistor pair voltage divider network for each input to said compressor amplifier stage;
    a power amplifier for providing signal gain to the compressed signals and producing an output signal for driving a receiver transducer to produce received audio signals;
    a compressor detector coupled to said power amplifier, for producing a compression control signal,
    said compressor detector including means for comparing the power amplifier output signal with a reference voltage level to produce the compressor gain control signal; and
    a bias current source, for supplying operating current to the compressor amplifier stage,
    said bias current source adjusting the supply of operating current in response to the gain control signal from said compressor detector.

5. The circuit of claim 4 further comprising:
    current steering means coupled to said bias current source for converting both polarities of electrical signals to direct current electrical power to power the circuit.

6. The circuit of claim 4 further comprising:
    means for supplying electrical power to the circuit stages; and
    a bias controller responsive to circuit power supply voltage level, for producing a bias current control signal,
    said bias controller including means for comparing a voltage proportional to the bias current to a regulated reference voltage level and producing the bias current control signal, and
    means for applying the bias current control signal to said bias current source to provide for regulation of the operating current to said compressor amplifier stage in the presence of large power supply voltage level fluctuations.

7. A receiver conditioning circuit for compressing received audio signals to a specific maximum level, comprising:
    input circuit means, for attenuating incoming electrical voice signals;
    means for applying compression to attenuated incoming electrical voice signals in response to a compression control signal;
    means for supplying operating bias current to said compression means;
    said bias current supply means receiving the compression control signal and in response supplying operating current to said compression means that establishes the effective amplification of attenuated incoming electrical voice signals;

means coupled to said signal compression means, for providing signal gain to compressed signals to generate a signal for driving a receiver transducer producing received audio signals; and
a compression detector coupled to said gain means, for comparing the amplitude of the receiver transducer driving signal with a reference level and producing the compression control signal.

8. The circuit of claim 7 which further comprises:
a bias controller responsive to circuit power supply voltage level, for producing a bias control signal;
said bias controller being coupled to said bias current supply means to apply the bias control signal thereto and provide regulation of the operating bias current in the presence of large supply voltage level fluctuations.

9. A voice communication instrument system for two-way voice communication, comprising:
a voice communication instrument including a microphone, for producing electrical voice signals, and a receiver transducer, for converting received electrical voice signals to audible sound;
a transmit circuit coupled to the microphone, for providing amplified microphone electrical voice signals of both polarities of D.C. over output lines and in a voltage range of 1.6 to 6 volts;
a receiver conditioning circuit coupled to the receiver transducer, for receiving incoming electrical voice signals and providing received electrical voice signals to said receiver transducer,
said receiver conditioning circuit including means for applying compression to incoming electrical voice signals to limit said signals to a specific maximum amplitude level; and
a current steering circuit coupled to the transmit circuit output lines for producing direct current electrical output power in a voltage range of 1.2 to 3.0 volts to provide line-powered operation of said receiver conditioning circuit.

10. A receiver conditioning circuit for providing conditioned receiver audio signals comprising:
means for linearly applying compression to incoming electrical voice signals in response to a compression control signal, to limit said signals to specific maximum level;
means coupled to said signal compression means, for providing signal gain to compressed signals, and for generating a signal to drive a receiver transducer receiver audio signals;
a compression detector coupled to said gain means for comparing the amplitude of the receiver transducer driving signal with a reference level and producing the compression control signal; and
means for supplying operating bias current to said compression means;
said bias current supply means receiving the compression control signal and in response supplying operating current to said compression means that establishes the effective amplification of incoming electrical voice signals.

11. A receiver conditioning circuit for compressing incoming audio signals to a specific maximum level, comprising:
means for applying compression to incoming electrical voice signals in response to a compression control signal;
means for supplying operating bias current to said compression means;
said bias current supply means receiving the compression control signal and in response supplying operating current to said compression means that establishes the effective amplification of incoming electrical voice signals;
means coupled to said signal compression means, for providing signal gain to compressed signals and for driving a receiver transducer producing received audio signals; and
a compression detector coupled to said gain means, for comparing the amplitude of the receiver transducer driving signal with a reference level and producing the compression control gain.

* * * * *

UNITED STATES PATENT AND TRADEMARK OFFICE
CERTIFICATE OF CORRECTION

PATENT NO. :  4,536,888
DATED      :  August 20, 1985
INVENTOR(S) :  Donald R. Wilson It is certified that error appears in the above-identified patent and that said Letters Patent is hereby corrected as shown below:

Column 12, line 40, delete "gain" and insert --signal--.

Signed and Sealed this

Seventh Day of January 1986

[SEAL]

Attest:

DONALD J. QUIGG

*Attesting Officer*        *Commissioner of Patents and Trademarks*